United States Patent
Harada et al.

(10) Patent No.: US 8,200,223 B2
(45) Date of Patent: Jun. 12, 2012

(54) BASE STATION AND DATA TRANSFER METHOD FOR TRANSFERRING DATA WHEN A MOBILE STATION PERFORMS A HANDOVER

(75) Inventors: Atsushi Harada, Kawasaki (JP); Masayuki Motegi, Yokohama (JP); Sadayuki Abeta, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 873 days.

(21) Appl. No.: 12/092,659

(22) PCT Filed: Nov. 2, 2006

(86) PCT No.: PCT/JP2006/321972
§ 371 (c)(1),
(2), (4) Date: Oct. 8, 2008

(87) PCT Pub. No.: WO2007/052745
PCT Pub. Date: May 10, 2007

(65) Prior Publication Data
US 2009/0036129 A1    Feb. 5, 2009

(30) Foreign Application Priority Data
Nov. 4, 2005    (JP) .............................. P2005-321595

(51) Int. Cl.
*H04M 11/00*    (2006.01)
(52) U.S. Cl. .................... 455/436; 455/408; 455/414.2; 370/235; 709/201
(58) Field of Classification Search ................. 455/436, 455/561, 438, 435.3, 428, 432.1, 445, 408, 455/410, 415, 435.1–443, 414.2; 370/312, 370/331, 332, 333, 328, 352, 235; 709/201–203
See application file for complete search history.

(56) References Cited

U.S. PATENT DOCUMENTS

| | | | | |
|---|---|---|---|---|
| 6,639,903 | B2 * | 10/2003 | Nakano et al. ............. | 370/310.2 |
| 7,418,273 | B2 * | 8/2008 | Tomoe et al. .................. | 455/561 |
| 7,869,803 | B2 * | 1/2011 | Corson et al. ................. | 455/433 |
| 2002/0027907 | A1 * | 3/2002 | Tateoka ........................ | 370/389 |
| 2004/0066780 | A1 * | 4/2004 | Shankar et al. ............... | 370/389 |

FOREIGN PATENT DOCUMENTS
JP    2001-160981    6/2001
(Continued)

OTHER PUBLICATIONS
International Search Report for International Application No. PCT/JP2006/321972, mailed on Feb. 13, 2007 (5 pages).
(Continued)

*Primary Examiner* — Kamran Afshar
*Assistant Examiner* — Kenneth Corbin
(74) *Attorney, Agent, or Firm* — Osha Liang LLP (57) ABSTRACT

A base station according to the present invention includes: a data storage unit 119 configured to temporarily store user data, when the base station transmits and receives the user data to and from a mobile station; an identifier adding unit 116 configured to add, to the user data stored in the data storage unit, a transfer identifier which indicates that the user data is transferred to an other base station by a handover, when the mobile station performs the handover from the base station to the other base station; and a data transfer unit 118 configured to transfer, to the other base station through a transfer apparatus, the user data to which the transfer identifier is added.

8 Claims, 8 Drawing Sheets

FOREIGN PATENT DOCUMENTS

| | | |
|---|---|---|
| JP | 2002-125254 | 4/2002 |
| JP | 2004-128551 | 4/2004 |
| WO | 2004/030396 A1 | 4/2004 |

OTHER PUBLICATIONS

R. Koodli, Ed. "Fast Handovers for Mobile IPv6", RFC4068, IETF, Jul. 2005 (30 pages).

Patent Abstracts of Japan for Japanese Publication No. 2002-125254, Publication date Apr. 26, 2002 (1 page).

Patent Abstracts of Japan for Japanese Publication No. 2001-160981, Publication date Jun. 12, 2001 (1 page).

Patent Abstracts of Japan for Japanese Publication No. 2004-128551, Publication date Apr. 22, 2004 (1 page).

\* cited by examiner

BASE STATION AND DATA TRANSFER METHOD FOR TRANSFERRING DATA WHEN A MOBILE STATION PERFORMS A HANDOVER

TECHNICAL FIELD

The present invention relates to techniques for transferring data between base stations. In particular, the present invention relates to a base station and a data transfer method for transferring data between base stations when a mobile station performs a handover.

BACKGROUND ART

The application of a hard handover has been proposed as a handover between base stations (cells) for the evolved universal terrestrial radio access network (E-UTRAN) system of a next-generation radio access network. A discussion of the application of the hard handover has been started in the Third Generation Partnership Project (3GPP). In the hard handover, a mobile station establishes a radio link with a hard handover destination base station after the mobile station disconnects a radio link with a hard handover source base station.

Accordingly, the use of hard handover makes a system less complicated in comparison with a system using a soft handover. However, in the hard handover, the handover destination base station cannot receive user data that remains stored in the handover source base station. Hence, there has been a known method in which the handover source base station transfers the user data to the handover destination base station in packet units (refer to Non-Patent Document 1, for example).

However, normal data flows through a transmission path as a traffic. Thus, when a plurality of the mobile stations exists and when the plurality of the mobile stations performs the handover and a data communication, a congestion occurs on the transmission path by normal data and user data which is transferred between base stations at the time of the handover.

Due to the congestion on the transmission path, the user data transferred at the time of the handover could be lost. As a result, the user data is retransmitted in an upper layer. Therefore, a user throughput could largely deteriorate, and a duration of an instantaneous interruption that occurs at the time of the handover could be increased.

Non-Patent Document 1: "Fast Handovers for Mobile IPv6", RFC4068

DISCLOSURE OF THE INVENTION

In view of the above problem, the present invention provides a base station and a data transfer method, which can shorten a duration of an instantaneous interruption that occurs at a time of a handover.

In order to solve the above problem, a first aspect of the present invention is a summarized as a base station, including: a data storage unit configured to temporarily store user data, when the base station transmits and receives the user data to and from a mobile station; an identifier adding unit configured to add, to the user data stored in the data storage unit, a transfer identifier which indicates that the user data is transferred to an other base station by a handover, when the mobile station performs the handover from the base station to the other base station; and a data transfer unit configured to transfer, to the other base station through a transfer apparatus, the user data to which the transfer identifier is added.

In the first aspect of the present invention, it is preferable that the base station is configured such that the user data to which the transfer identifier is added is preferentially transferred to the other base station, in comparison with normal data to which the transfer identifier is not added, in the transfer apparatus.

In the first aspect of the present invention, it is preferable that the base station is configured to further include a judgment unit configured to judge a radio access scheme of the other base station; and a priority level determination unit configured to determine a transfer priority of the user data based on a judgment result of the radio access scheme, and the identifier adding unit is configured to add, to the user data stored in the data storage unit, the transfer identifier in accordance with the transfer priority.

In the first aspect of the present invention, it is preferable that in the base station, the user data is transferred to the other base station in a frame unit and the transfer identifier is added to a header of the frame.

In the first aspect of the present invention, it is preferable that the user data is transferred to the other base station in a packet unit, and the transfer identifier is added to a header of the packet.

Further, the second aspect of the present invention is summarized as a data transfer method used in a base station, including: storing user data temporarily, when the base station transmits and receives the user data to and from a mobile station; adding, to the stored user data, a transfer identifier which indicates that the user data is transferred to an other base station by a handover, when the mobile station performs the handover from the base station to the other base station; and transferring, to the other base station through a transfer apparatus, the user data to which the transfer identifier is added.

In the data transfer method according to the second aspect, it is preferable that the user data to which the transfer identifier is added is preferentially transferred to the other base station, in comparison with normal data to which the transfer identifier is not added, in the transfer apparatus.

In the data transfer method according to the second aspect, it is preferable that the data transfer method further includes: judging a radio access scheme of the other base station; and determining a transfer priority of the user data based on a judgment result of the radio access scheme, and in adding the transfer identifier, the transfer identifier in accordance with the transfer priority is added to the user data stored in the data storage unit.

In the data transfer method according to the second aspect, it is preferable that the user data is transferred to the other base station in a frame unit, and the transfer identifier is added to a header of the frame.

In the data transfer method according to the second aspect, it is preferable that the user data is transferred to the other base station in a packet unit, and the transfer identifier is added to a header of the packet.

BEST MODE FOR CARRYING OUT THE INVENTION

Next, an embodiment of the present invention will be described with reference to the drawings. In the following description of the drawings of the embodiment, the same or similar numerals are assigned to the same or similar parts.

Figure 1:
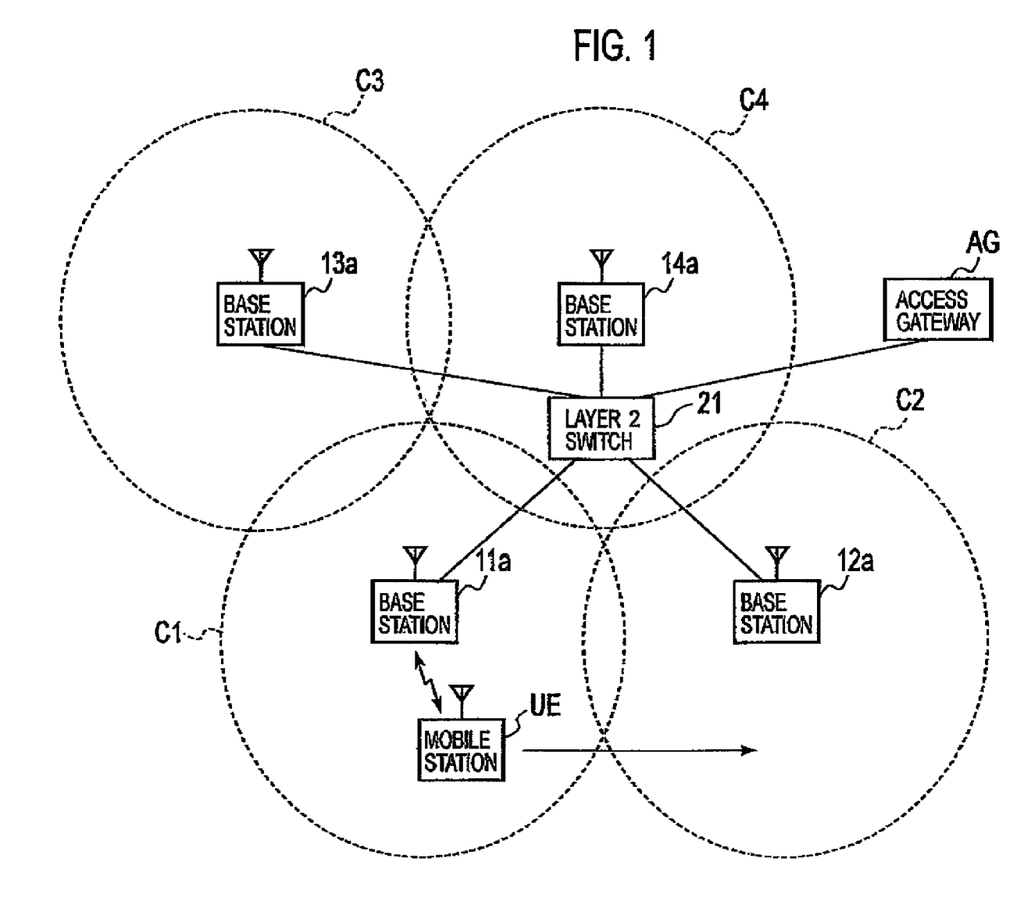
FIG. 1 is a diagram showing a configuration example of a mobile communication system according to an embodiment of the present invention.

As shown in FIG. 1, a mobile communication system according to the embodiment of the present invention includes a mobile station UE, a plurality of base stations 11a to 14a, a transfer apparatus (a Layer 2 switch 21), and an access gateway AG. In FIG. 1, the Layer 2 switch 21 is used as the transfer apparatus.

As an example, the base stations 11a to 14a and the access gateway AG are connected in a star pattern with the Layer 2 switch 21 centered, thereby forming a configuration enabling each of the base stations to transfer data to an other base station via the Layer 2 switch 21. The access gateway AG is connected to a core network, which is omitted in the FIG. 1. Meanwhile, the base stations 11a to 14a respectively form cells C1 to C4.

It should be noted that each of the base stations may include multiple directional antennas, and each of the cells may include multiple sectors, respectively.

The mobile station UE performs a hard handover as a handover.

"Hard handover" refers to the handover in which the mobile station UE establishes a radio link with a hard handover destination base station after the mobile station disconnects a radio link with a hard handover source base station, when the mobile station UE moves from the cell C1 to the cell C2.

In other words, in the hard handover, the mobile station UE transmits and receives user data to and from only a single base station at all times.

Among the base stations 11a to 14a, a transmission path is set between two base stations of the base stations 11a to 14a. The transmission path enables a transfer of the user data stored in the handover source base station to the handover destination base station, when the mobile station UE performs the hard handover (hereinafter, simply referred to as handover).

Specifically, the transfer of the user data through the Layer 2 switch 21 is achieved when the handover source base station designates an address of the handover destination base station.

Note that in the example in FIG. 1, the mobile station UE moves from the cell C1 side of the base station 11a, to the cell C2 side of the base station 12a. Further, the base station 11a is the handover source bass station, and the base station 12a is the handover destination base station.

Figure 2:
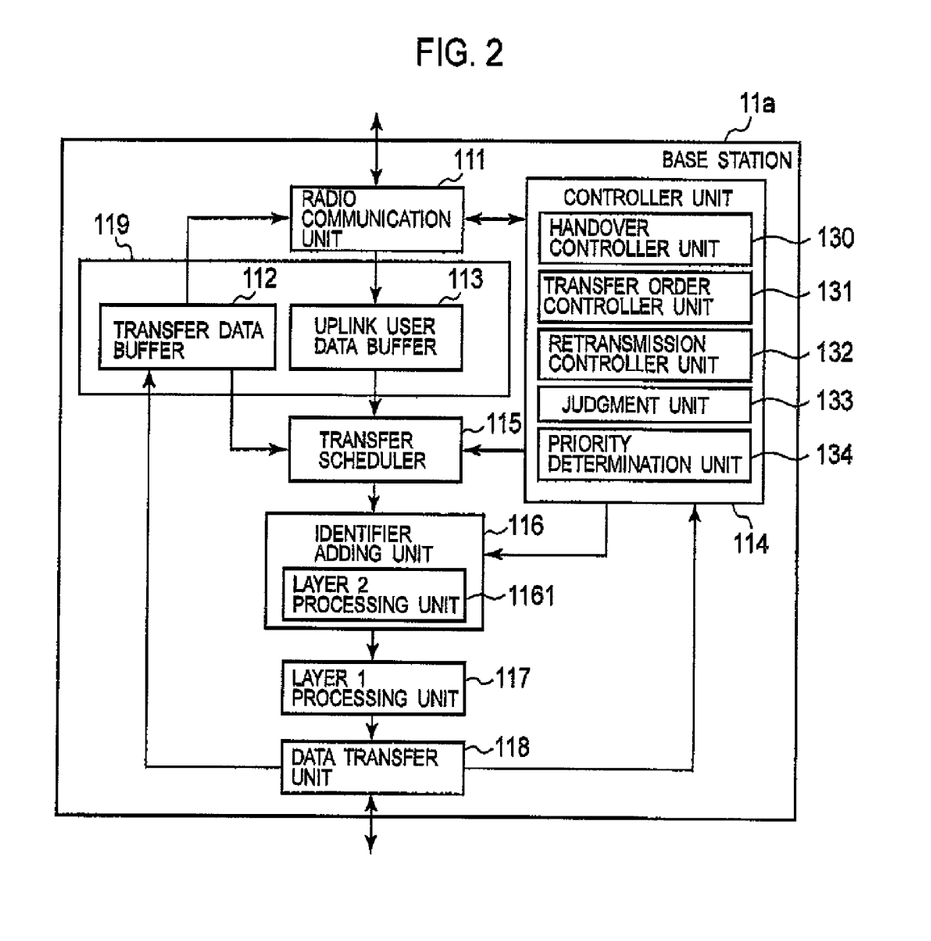
FIG. 2 is a diagram showing a configuration example of a base station according to the embodiment of the present invention.

As shown in FIG. 2, the base station 11a is provided with a radio communication unit 111, a controller unit 114, a transfer scheduler 115, an identifier adding unit 116, a Layer 1 processing unit 117, a data transfer unit 118, and a data storage unit 119.

The data storage unit 119 temporarily stores the user data when the base station transmits and receives the user data to and from the mobile station UE.

The identifier adding unit 116 adds, to the user data stored in the data storage unit 119, a transfer identifier which indicates that the user data is transferred to the handover destination base station 12a by the handover, when the mobile station UE performs the handover to the handover destination base station 12a.

Here, "user data transferred to the handover destination base station by the handover" refers to, for example, downlink user data yet to be transmitted to the mobile station UE, downlink user data being retransmitted, or the like, in the handover source base station.

The data transfer unit 118 transfers, to the handover destination base station 12a through the Layer 2 switch 21, the user data to which the transfer identifier is added.

Functions of the radio communication unit 111, the controller unit 114, the Layer 1 processing unit 117, and the transfer scheduler 115 will be described later.

Each of the base stations 12a to 14a in FIG. 1 has the same configuration as the base station 11a in FIG. 2.

The Layer 2 switch 21 preferentially transfers, to the base station 12a, the user data to which the transfer identifier from the base station 11a is added, in comparison with normal data to which the transfer identifier from the base station 11a is not added.

As an example, a first transmission path from the base station 11a to the base station 12a via the Layer 2 switch 21; a second transmission path from the base station 13a to the base station 12a via the Layer 2 switch 21; and a third transmission path from the base station 14a to the base station 12a via the Layer 2 switch 21 are assumed.

Here, when the user data to which the transfer identifier is added is transmitted on the first transmission path, and when the normal data to which the transfer identifiers is not added is transmitted on the second and third transmission paths, the Layer 2 switch 21 preferentially transfers, to the base station 12a, the user data transmitted on the first transmission path.

When the Layer 2 switch 21 preferentially transfers, to the base station 12a, the user data transmitted on the first transmission path, the normal data, to which the transfer identifier is not added and is transmitted on the second and third transmission paths, is stored, for example, in a buffer (not shown) in the Layer 2 switch 21.

In this manner, it is possible to implement a mobile communication system that can preferentially transfer user data between base stations in which the handover is performed.

Figure 3:
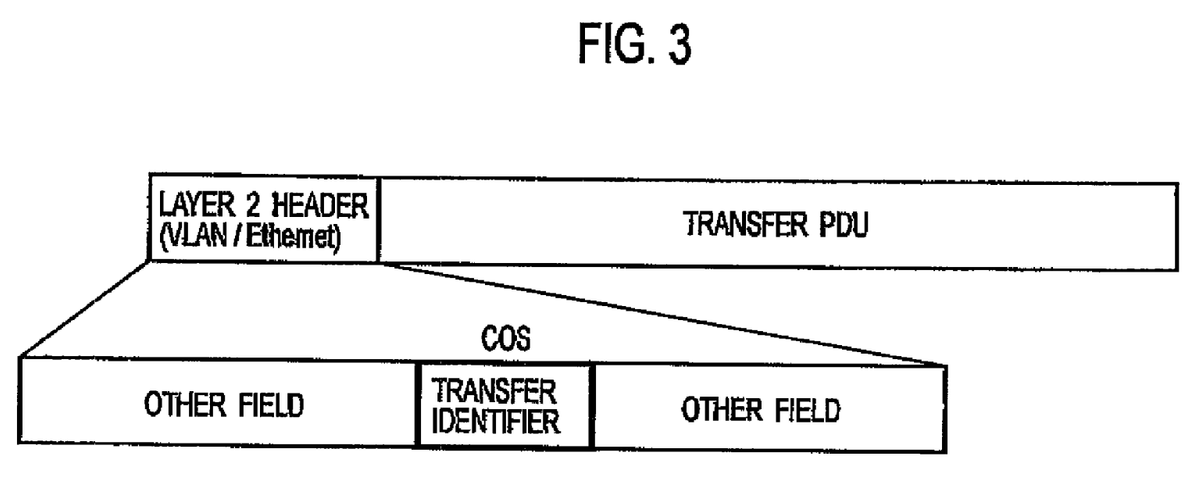
FIG. 3 is a schematic diagram showing an example of a frame transferred between the base stations according to the embodiment of the present invention.

Moreover, as shown in FIG. 3, the data transfer unit 118 transfers, to the handover destination base station 12a, the user data in frame units.

A Layer 2 processing unit 1161 of the identifier adding unit 116 adds the transfer identifier to a Layer 2 frame header.

The user data processed at the Layer 2 processing unit 1161 is further processed at the Layer 1 processing unit 117. Then, the user data can utilize the data transfer unit, that is, a virtual local area network (VLAN) function of the Ethernet (registered trademark) in this case.

In other words, as a field for adding the transfer identifier, a class of service (CoS) field in a VLAN tag can be used.

Accordingly, by using the existing Layer 2 switch 21, it is possible to implement a detection of the transfer identifier in the Layer 2 switch 21 and a preferential transfer of a frame that includes the transfer identifier.

Further, uplink user data that the base station 11a receives from the mobile station UE in FIG. 1 is temporarily stored in an uplink user data buffer 113 of the data storage unit 119 in FIG. 2.

On the other hand, downlink user data that the base station 11a receives from a network side is temporarily stored in a transfer data buffer 112 of the data storage unit 119 via the data transfer unit 118.

The transfer scheduler 115 determines a transfer order for transferring, to the network side, the user data stored in the data storage unit 113.

The controller unit 114 controls an overall operation of the base station 11a. To be specific, the controller unit 114 is provided with a handover controller unit 130, a transfer order controller unit 131, a retransmission controller unit 132, a judgment unit 133, and a priority determination unit 134.

The handover controller unit 130 controls an operation of the hard handover.

The transfer order controller unit 131 controls the transfer scheduler 115 based on QoS information. Here, the QoS information includes such as a type of the user data to be transferred.

As the "type of the user data", at least any one of a content of the user data (conversation data, streaming data, interactive data background data, or the like), a destination of the transmission and the reception of the user data, and a direction (uplink or downlink) of the user data, can be used.

The retransmission controller unit 132 performs a retransmission control in order to compensate for a loss of the user data. User data acknowledged by means of the retransmission control between the base station and the mobile station UE is deleted from the transfer data buffer 112.

The judgment unit 133 judges a radio access scheme of the handover destination base station 12a.

The priority determination unit 134 determines a transfer priority of the user data based on a judgment result of the radio access scheme.

A handover that involves a switch of the radio access schemes requires longer time in comparison with a handover performed within a single radio access scheme.

For this reason, the priority determination unit 134 sets the transfer priority to "high" for the handover involving the switch of the radio access schemes, and sets the transfer priority to "low" for the handover performed within the single radio access scheme.

As a result, when multiple pieces of the user data to which the transfer identifier is added respectively are transferred from different base stations to the Layer 2 switch 21, the Layer 2 switch 21 preferentially transfers, to the transfer destination base station 12a, the user data to which the transfer identifier having a "high" transfer priority. Accordingly, it is possible to set priority among the multiple pieces of the user data to which the transfer identifier is added respectively.

Hereinafter, with reference to a sequence diagram shown in FIG. 4, an operation of the mobile station UE, the base station 11a, the base station 12a, and the Layer 2 switch 21 shown in FIG. 1 at the time of the handover will be described.

Note that the operation will be described for an example in which the mobile station UE transmits and receives the user data to and from the access gateway AG through the handover source base station 11a, and through the Layer 2 switch 21, before an initiation of the handover.

Figure 4:
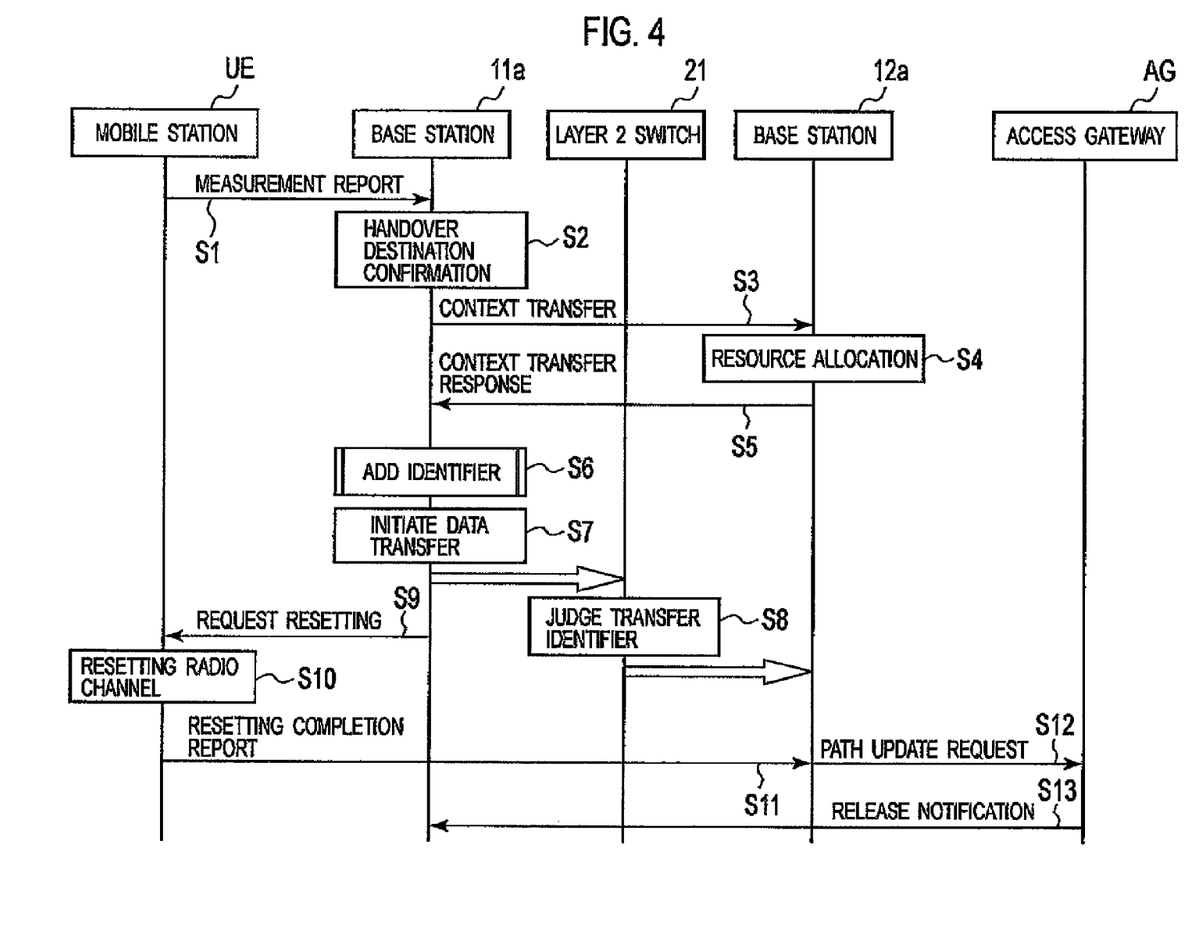
FIG. 4 is a sequence diagram showing an exemplar procedure of a data transfer method according to the embodiment of the present invention.

Firstly, in step S1 of FIG. 4, the mobile station UE performs a neighbor cell search so that the handover source base station 11a can select an appropriate handover destination base station (the cell).

Based on the result of the neighbor cell search, the mobile station UE so transmits a measurement report to the bass station 11a. Here, the measurement report includes information of the base station that is a candidate of the handover destination base station.

Next, in step S2, based on the measurement report from the mobile station UE, the handover source base station 11a determines whether the initiation of the handover is required.

When the handover source base station 11a determines the initiation of the handover is required, a selection is made for the appropriate base station from among the base stations which are the candidate of the handover destination base station, in accordance with a resource availability and the like.

In step S3, the handover source base station 11a transfers, to the base station 12a through the Layer 2 switch 21, a context including a handover request, QoS information, and the like.

In step S4, the handover destination base station allocates and reserves a resource for the mobile station UE, based on the QoS information transferred from the handover source base station 11a.

When the handover destination base station 12a determines whether or not the resource required for the mobile station can be reserved, the processing proceeds to step S5.

In step S5, the handover destination base station 12a notifies whether or not the resource is successfully reserved, to the handover source base station 11a through the Layer 2 switch 21. Concurrently, the handover source base station 11a obtains information of the radio access scheme and the like of the handover destination base station 12a.

When the handover source base station 11a is notified that the resource can be reserved, the base station 11a determines the base station 12a as the handover destination base station.

On the other hand, when the handover source base station 11a is notified that the resource cannot be reserved, the processing returns to step S3, and the base station 11a performs an operation of the handover request towards an other base station that is included in the measurement report from the mobile station UE.

Note that the configuration is not limited to that the handover destination base so station 12a notifies the radio access scheme to the handover source base station 11a. Instead, the access gateway AG or the core network may be configured to notify, to the handover source base station 11a, the radio access scheme of the handover destination base station 12a.

In step S6, the handover source base station 11a adds the aforementioned transfer identifier to the user data to be transferred to the handover destination base station 12a.

In step S7, after the handover source base station 11a receives a report of a completion of a handover preparation from the handover destination base station 12a, the handover source base station 11a initiates a transfer of the user data.

In step S8, the Layer 2 switch 21 detects the transfer identifier added to a header of each frame of the user data, and preferentially transfers, to the handover destination base station 12a, the frame to which the transfer identifier is added.

In step S9, the handover source base station 11a notifies, to the mobile station UE, information required for resetting a radio link between the mobile station UE and the handover destination bass station 12a.

In step S10, the mobile station UE establishes a radio synchronization with the handover destination base station 12a, and sets a radio channel.

In step S11, after the radio channel between the mobile station UE and the handover destination base station 12a is set, the mobile station UE notifies, to the handover destination base station 12a, that the handover is completed.

In step S12, the handover destination base station 12a transmits a path update request to the access gateway AG.

The access gateway AG performs a path update for updating a destination address from the handover source base station 11a to the handover destination base station 12a.

In step S13, the access gateway AG releases a signaling between the access gateway AG and the handover source base station 11a.

Figure 5:
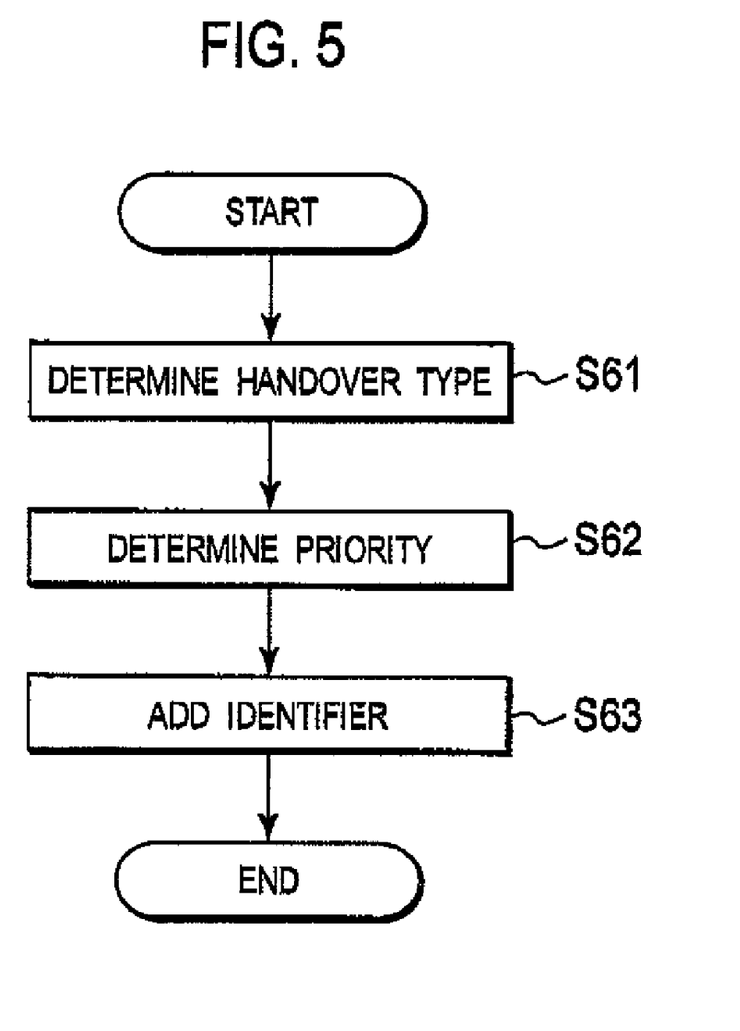
FIG. 5 is a flowchart illustrating an exemplar operation of the base station according to the embodiment of the present invention.

Next, with reference to a flowchart shown in FIG. 5, an exemplar processing procedure of adding the transfer identifier shown in step S6 of FIG. 4 will be described.

Firstly, in step S61, the controller unit 114 of FIG. 2 determines the radio access scheme of the handover destination base station 12a.

The radio access scheme is determined on the basis of a content of a context transfer response shown in step S5 of FIG. 4.

In step S62, the priority determination unit 134 determines the transfer priority of the user data based on a result of step S61.

In step S63, the identifier adding unit 116 adds, to the user data stored in the data storage unit 119, the transfer identifier in accordance with the transfer priority determined in step S62.

As described above in detail, according to the embodiment of the present invention, the Layer 2 switch 21 can identify the user data transferred between base stations at the time of the handover, from the normal data. Accordingly, even when the congestion occurs on the transmission path, the user data to be transferred between base stations at the time of a handover can be transferred preferentially.

Accordingly, the loss of the user data transferred between the base stations at the time of the handover can be reduced significantly, and the duration of the instantaneous interruption in the mobile station UE can be shortened significantly.

MODIFIED EXAMPLE

In the above embodiment, the example has been described in which the transfer of the user data at the time of the handover is achieved by using the Layer 2 protocol. A modified example of the embodiment of the present invention that uses a Layer 3 protocol will be described below.

Figure 6:
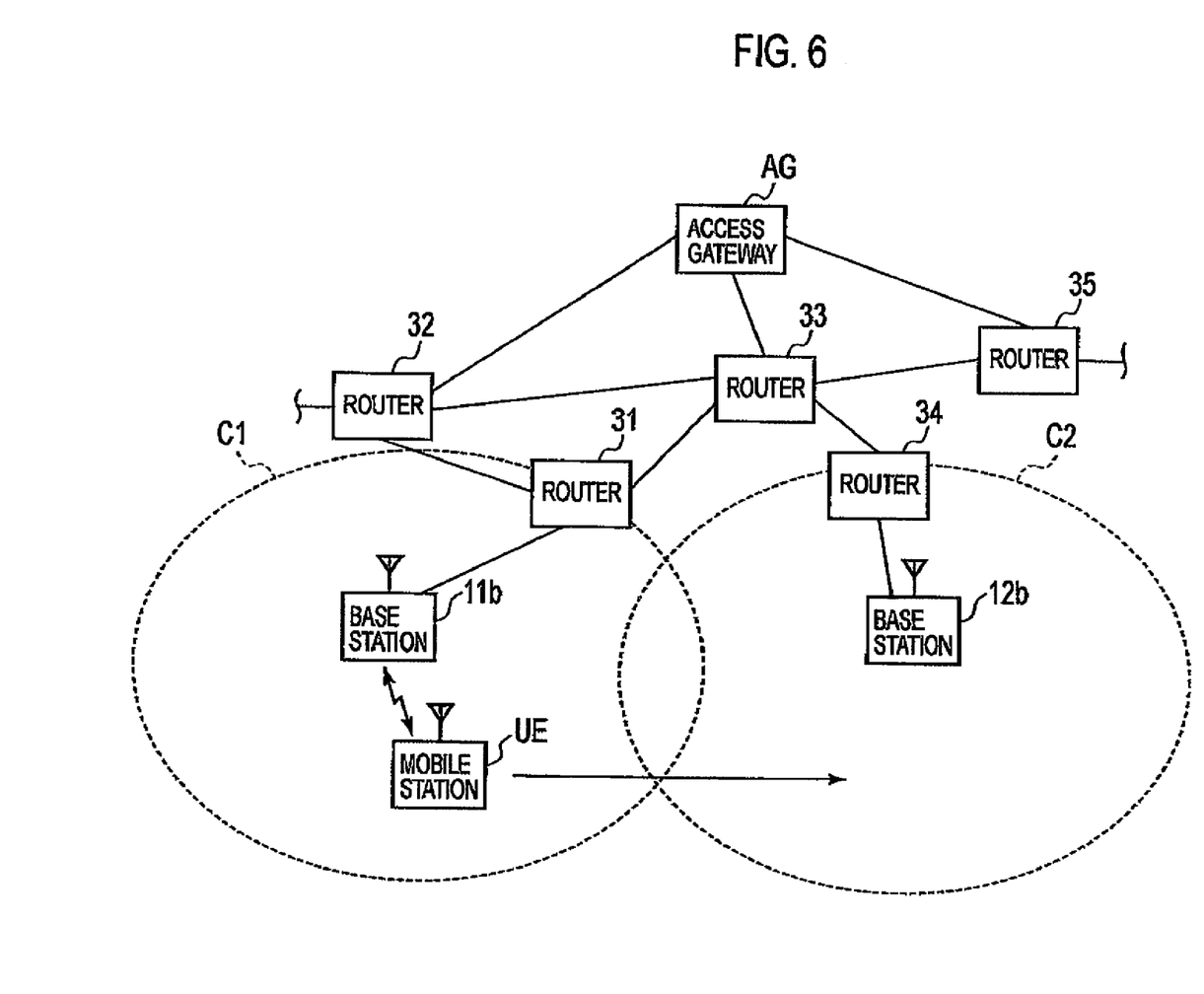
FIG. 6 is a diagram showing a configuration example of a mobile communication system according to a modified example of the embodiment of the present invention.

As shown in FIG. 6, a mobile communication system according to the modified example of the embodiment of the present invention is different from the embodiment of the present invention in FIG. 1, which uses the Layer 2 switch 21 as the transfer apparatus, in that a plurality of routers 31, 32, . . . are used as the transfer apparatus.

The user data is transferred by an IP routing of each of the plurality of the routers 31, 32, . . . .

Note that in the example shown in FIG. 6, the mobile station UE moves from the cell C1 side of the base station 11b to the cell C2 side of the base station 12b, the base station 11b is the handover source base station, and the base station 12b is the handover destination base station.

Figure 7:
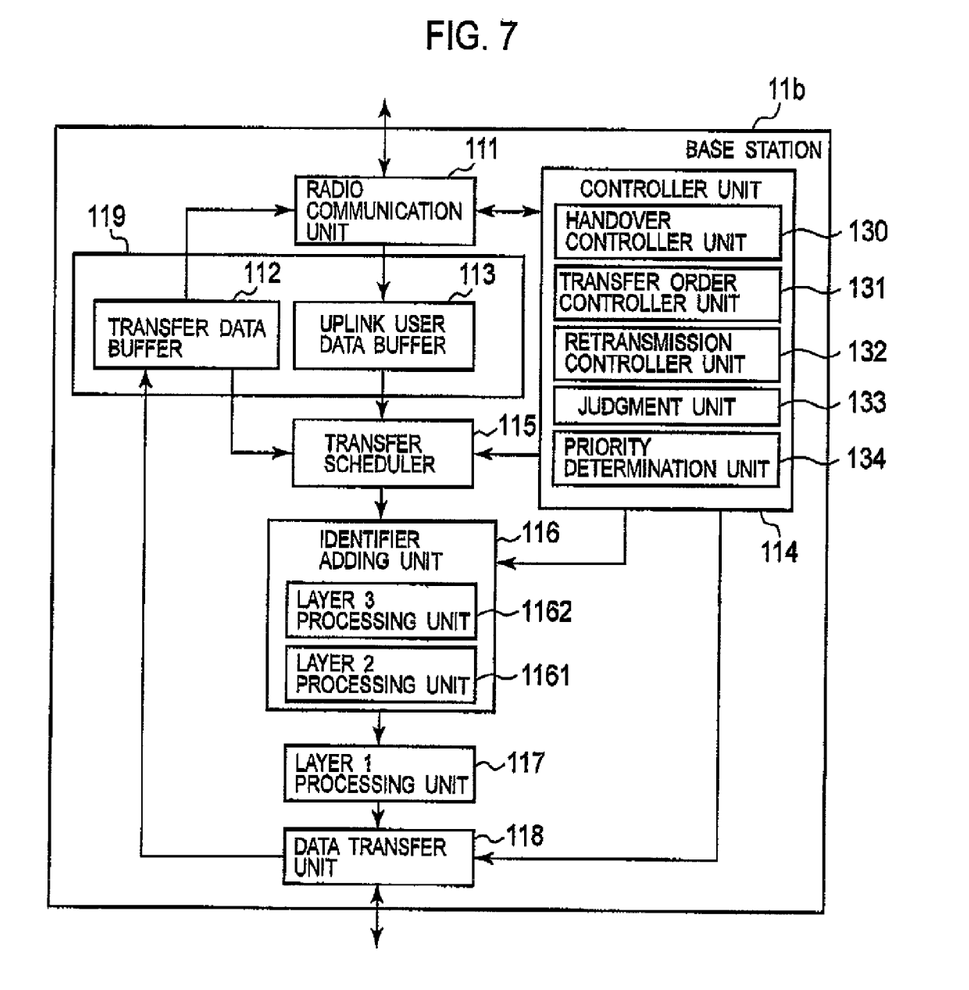
FIG. 7 is a diagram showing a configuration example of a base station according to the modified example of the embodiment of the present invention.

As shown in FIG. 7, the base station 11b is different from the base station 11a shown in FIG. 2 in that the base station 11b is provided with a Layer 3 processing unit 1162 in the identifier adding unit 116.

Figure 8:
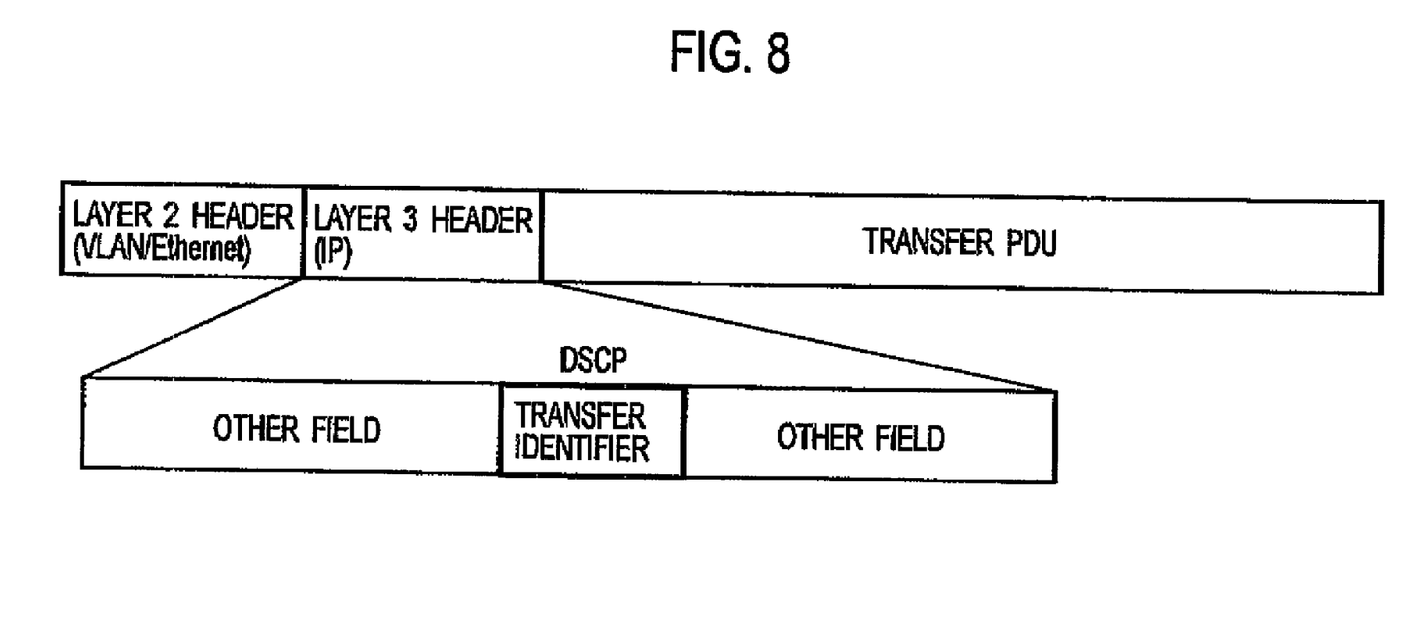
FIG. 8 is a schematic diagram of an example of a packet transferred between the base stations according to the modified example of the embodiment of the present invention.

In other words, as shown in FIG. 8, the user data is transferred to the handover destination base station 12b in the packet units, and the Layer 3 processing unit 1162 adds the transfer identifier to the header of the packet.

In this case, the Layer 3 processing unit 1162 encapsulates the user data to be transferred, at the Layer 3 with TCP/IP, UDP/IP or the like, so that the transfer identifier is added to a header of the Layer 3 frame (DiffServ code point (DSCP), for example).

Accordingly, by use of an existing router, the transfer identifier can be detected and an IP packet that includes the transfer identifier can be preferentially transferred.

Thus, according to the modified example of the embodiment of the present invention, it is possible to provide a mobile communication system and a mobile communication method, which can identify the user data transferred between base stations at the time of the handover, from the normal data, on the transmission path, i.e., in the transfer apparatus such as the router or the like.

Moreover, even on a complicated transmission path, the priority can be added to the user data transferred between the base stations at the time of the handover.

(Other Embodiments)

Although the present invention has been described by use of the embodiment as mentioned above, the description and drawings constituting a part of the disclosure should not be regarded as those that limit the present invention. Various alternative embodiments, examples and operational techniques should be apparent to those skilled in the art from the disclosure.

The mobile communication system according to the above embodiment is applicable to high speed packet communication systems such as "high speed downlink packet access (HSDPA)" and "high speed uplink packet access (HSUPA)".

The above description is given for an example that a consistency or an inconsistency of the radio access scheme applied between base stations at the time of the handover is used as a criterion for determining the priority of the transfer so identifier.

However, the criterion for determining the priority is not limited to the radio access scheme. For instance, the aforementioned type of the user data may be used as the criterion for determining the priority of the transfer identifier. When a plurality of mobile stations UE exists in a single cell, the amount of data of each of the mobile stations UE, which is stored in the mobile station 11a, the traveling speed of each of the mobile stations UE, or the like may be used as the criterion for determining the priority of the transfer identifiers.

It should be understood that the present invention thus encompasses various other embodiments which are not expressly stated herein. Accordingly, the present invention is limited only by the matters defined by the appended claims which are appropriate from the disclosure of this invention.

Industrial Applicability

The present invention can provide a base station and a data transfer method, which can shorten a duration of an instantaneous interruption that occurs at the time of a handover.

The invention claimed is:

1. A base station, comprising:
   a data storage unit configured to temporarily store user data, when the base station transmits and receives the user data to and from a mobile station;
   an identifier adding unit configured to add, to the user data stored in the data storage unit, a transfer identifier which indicates that the user data is transferred to another base station by a handover, when the mobile station performs the handover from the base station to the other base station;

a data transfer unit configured to transfer, to the other base station through a transfer apparatus, the user data to which the transfer identifier is added;

a judgment unit configured to judge a radio access scheme of the other base station; and a priority level determination unit configure to determine a transfer priority of the user data based on a judgment result of the radio access scheme, wherein the identifier adding unit is configured to add, to the user data stored in the data storage unit, the transfer identifier in accordance with the transfer priority.

2. The base station according to claim 1, wherein the user data to which the transfer identifier is added is preferentially transferred to the other base station, in comparison with normal data to which the transfer identifier is not added, in the transfer apparatus.

3. The base station according to claim 1, wherein the user data is transferred to the other base station in a frame unit, and the transfer identifier is added to a header of the frame.

4. The base station according to claim 1, wherein the user data is transferred to the other base station in a packet unit, and the transfer identifier is added to a header of the packet.

5. A data transfer method used in a base station, comprising:

storing user data temporarily, when the base station transmits and receives the user data to and from a mobile station;

adding, to the stored user data, a transfer identifier which indicates that the user data is transferred to another base station by a handover, when the mobile station performs the handover from the base station to the other base station;

transferring, to the other base station through a transfer apparatus, the user data to which the transfer identifier is added;

judging a radio access scheme of the other base station; and determining a transfer priority of the user data based on a judgment result of the radio access scheme, wherein in adding the transfer identifier, the transfer identifier in accordance with the transfer priority is added to the user data stored in the data storage unit.

6. The data transfer method according to claim 5, wherein the user data to which the transfer identifier is added is preferentially transferred to the other base station, in comparison with normal data to which the transfer identifier is not added, in the transfer apparatus.

7. The data transfer method according to claim 5, wherein the user data is transferred to the other base station in a frame unit, and the transfer identifier is added to a header of the frame.

8. The base station according to claim 5, wherein the user data is transferred to the other base station in a packet unit, and the transfer identifier is added to a header of the packet.

* * * * *